United States Patent
Singhal et al.

(10) Patent No.: US 12,157,751 B2
(45) Date of Patent: Dec. 3, 2024

(54) PROCESS FOR THE SYNTHESIS OF OLIGOMERIC SILOXANE HAVING SULFONE MOIETY, AND SILICON-CONTAINING COMPOUNDS HAVING SULFONE MOIETY

(71) Applicant: MOMENTIVE PERFORMANCE MATERIALS INC., Waterford, NY (US)

(72) Inventors: Praveen Kumar Singhal, Electronic (IN); Gourav Tarafdar, Bangalore Karnataka (IN); Apeksha Ramesh, Bangalore Karnataka (IN)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 17/725,080

(22) Filed: Apr. 20, 2022

(65) Prior Publication Data

US 2022/0380391 A1 Dec. 1, 2022

Related U.S. Application Data

(60) Provisional application No. 63/187,515, filed on May 12, 2021.

(51) Int. Cl.
*C07F 7/12* (2006.01)
*C07F 7/08* (2006.01)

(52) U.S. Cl.
CPC ............ *C07F 7/122* (2013.01); *C07F 7/0898* (2013.01)

(58) Field of Classification Search
CPC ...... C07F 7/0898; C07F 7/081; C07F 7/0838; C07F 7/0874; C07F 7/0827
See application file for complete search history.

(56) References Cited

FOREIGN PATENT DOCUMENTS

| CN | 109879902 A | 6/2019 |
|---|---|---|
| WO | 2016054621 A1 | 4/2016 |
| WO | 2022026307 A1 | 2/2022 |

OTHER PUBLICATIONS

Sakurai (Chemical Communications, 1967, pp. 889-890).*
Walree (Journal of Organometallic Chemistry, 496, 1995, 117-125).*
Green Chemistry, 2009, 11, 1401-1405—The open journal article discusses the oxidation of sulfur based compound to the corresponding sulfoxide using hydrogen peroxide.
International Search Report and Written Opinion from PCT/US2022/025522 mailed Aug. 8, 2022.
Database Reaxys [Online]; Elsevier ; Jan. 1, 1995; Walree C A: "Transmission of electronic effects via a SiMe2 spacer in 4-mono- and 4, 4 ' -disubstituted diphenyldimethylsilanes : 29Si and 13C NMR spectroscopy and PM3 semi-empirical calculations".
Carleer R et at.: "1H NMR Study of Some Substituted Acyclic Silaethanes, 2-Silapropanes and 2-Methyl-2-Silapropanes and Their Rotameric Populations Around the Si—C Bond", Omr Organic Magnetic Resonance, Heyden & Son Ltd, GB, 13(4), Jan. 1, 1980; pp. 253-258.
Blackwell David et al; "Stereoselective Synthesis of Disubstituted Butadienes via Copper-Mediated Coupling of Alkenyl Silanes", Synlett, 2011(15): Sep. 1, 2011; p. s2140-2144.
Suslova E N et al. : "4, 4-Dimethyl-1, 4-thiasilinane and Its S-Functional Derivatives " , Russian Journal of General Chemistry, Nauka/Interperiodica, MO, (75)8, Aug. 1, 2005; pp. 1234-1242.
Zhang Guowei et al: "Regulating photochemical behavior and property of imidazolium-based water soluble polysiloxane macromolecular photoinitiators by anions", Journal of Photochemistry, vol. 364, Sep. 1, 2018, pp. 363-372.
Naer et al.; A convenient synthesis of DL-homomethionine (5-methylthionovaline) Acta Chemica Scandinavica:; (1955), 9, 721-726.

* cited by examiner

*Primary Examiner* — Pancham Bakshi
(74) *Attorney, Agent, or Firm* — James C. Abruzzo

(57) ABSTRACT

There is provided herein a process for the synthesis of sulfonyl silanes. There is also provided herein various sulfenylated and sulfonylated silicon-containing compounds made by the process.

13 Claims, 3 Drawing Sheets

PROCESS FOR THE SYNTHESIS OF OLIGOMERIC SILOXANE HAVING SULFONE MOIETY, AND SILICON-CONTAINING COMPOUNDS HAVING SULFONE MOIETY

CROSS-REFERENCE TO RELATED APPLICATIONS

This application claims priority to U.S. Application Ser. No. 63/187,515, filed May 12, 2021, the entire contents of which are incorporated herein by reference.

FIELD OF THE INVENTION

The present invention relates to a process of making sulfonyl silanes, which sulfonyl silanes can be used in various commercial and industrial applications.

DESCRIPTION OF THE RELATED ART

Non aqueous solvents are employed in the electrolyte compositions of Lithium-ion (Li-ion) batteries. These solvents are prone to decomposition due to the electrochemical potential present during the charge-discharge cycles of the battery. However, certain additives, when added to the electrolyte composition, are known to prevent such decomposition. Such additives are believed to form a solid electrolyte interface (SEI) layer at the electrode, providing stability to the electrode and preventing elution of transition metal ions to the electrolyte composition. One group of such SEI layer-forming electrolyte additives are sulphonyl silanes.

Conventional processes for the synthesis of sulfonyl silane electrolytic additives do not provide the desired yield, and/or are cost intensive, and hence, are not commercially viable. For example, one conventional synthetic route for making sulfonyl silanes employs a hydrosilylation reaction, which has the drawback of requiring platinum catalysts, which are costly and still do not yield the desired results.

Thus, there is a need for intermediates and processes for synthesis of sulfonyl silanes that are capable of producing electrolyte additives for Lithium ion batteries in higher yield and in a more cost-effective manner.

SUMMARY OF THE INVENTION

The inventors herein have surprisingly discovered a process for forming sulfonyl silicon-containing materials, such as sulfonyl silanes, in much greater purity, and at a lower cost as compared to conventional hydrosilylation reaction processes of making sulfonyl silanes. In particular, it has unexpectedly been found that conducting an oxidation of a silane (i.e. forming the sulfone moiety) after the previous formation of an Si—C bond with a sulfenyl metal intermediate, is critical in avoiding intra-molecular reactions that form isomeric byproducts, and furthermore, provides for a reduced cost process for manufacturing sulfonyl silanes. In fact, hydrosilylation catalysts can be completely omitted in the process described herein. In addition, applicants have demonstrated that the reversal of the above-noted specifically oriented steps of oxidation following the formation of the Si—C bond, does not result in any product at all.

There is provided herein a process for the synthesis of sulfonyl silane(s) comprising the steps of:
(a) reacting a compound of formula (I):

X—(R*)$_n$—S—R (I)

with a metal (M) selected from the group consisting of Li, Na, Mg, Al, Cs, Sn, Ni, and Hg, to obtain a sulfenyl metal intermediate of the formula (II):

(X)$_a$-M-[(R*)$_n$—S—R]$_b$ (II)

(b) contacting the sulfenyl metal intermediate (II) with a silane of formula (III):

Si(X)$_2$(R$^1$)$_2$ (III)

to obtain a sulfenylated silicon-containing reaction product; and,
(c) contacting the sulfenylated silicon-containing reaction product with an oxidizing agent, wherein X is a halogen selected from the group consisting of Cl, Br and I; each subscript n is an integer from 1 to about 10; each R is H or a monovalent organic group having from 1 to about 12 carbon atoms, optionally having one or more heteroatoms, such as O, N or S; each R* is a divalent organic group having from 1 to about 8 carbon atoms, optionally having one or more heteroatoms, such as O, N or S; and, each R$^1$ is a monovalent organic group having from 1 to about 12 carbon atoms, optionally having one or more heteroatoms, such as O, N or S; the subscript a is 0 or 1; and, the subscript b is an integer of from 1 to about 10, with the proviso that when a is 0, then b is from 1 to about 10, and when a is 1, then b is 1.

In one embodiment X is Cl, each subscript n is an integer from 2 to 6, each R is H or a monovalent alkyl group of from 1 to about 4 carbon atoms, each R* is a divalent alkyl group having from 1 to about 6 carbon atoms, optionally having one or more heteroatoms, such as O, N or S, each R$^1$ is a monovalent alkyl group of from 1 to about 4 carbon atoms, the subscript a is 0 or 1; and, the subscript b is an integer of from 1 to about 10, with the proviso that when a is 0, then b is from 1 to about 10, and when a is 1, then b is 1.

In one embodiment X is Cl, each subscript n is an integer from 2 to 4, each R is independently H, methyl, ethyl or propyl, each R* is a divalent alkyl group of from 1 to about 4 carbon atoms, each R$^1$ is a monovalent alkyl group of from 1 to about 4 carbon atoms, the subscript a is 0 or 1; and, the subscript b is an integer of from 1 to about 10, with the proviso that when a is 0, then b is from 1 to about 10, and when a is 1, then b is 1.

In one embodiment X is Cl, each subscript n is an integer from 2 to 4, each R is independently H, methyl, ethyl or propyl, each R* is —(CH$_2$)—, each R$^1$ is methyl, the subscript a is 0 or 1; and, the subscript b is an integer of from 1 to about 10, with the proviso that when a is 0, then b is from 1 to about 10, and when a is 1, then b is 1.

There is provided herein a sulfenylated silicon-containing compound of the formula (IV):

Q-Si(R$^1$)$_2$—(R*)$_n$—S—R (IV)

where Q is a halogen selected from the group consisting of Cl, Br and I; or a moiety of the formula —(R*)$_n$—S—R; or a moiety of the formula —O—[Si(R$^1$)$_2$—O]$_y$—Si(R$^1$)$_2$—(R*)$_n$—S—R, and wherein each R$^1$, R* and R is as defined above, and wherein each subscript n is an integer from about 1 to about 10, and y is an integer from 1 to about 10. In one embodiment, y is an integer from 1 to 3.

There is also provided herein a sulfonylated silicon-containing compound of the formula (VI):

Q*Si(R$^1$)$_2$—(R*)$_n$—S(=O)$_2$—R (VI)

wherein Q* is Q$^{2*}$ or Q$^{3*}$; wherein Q$^{2*}$ is a moiety of the formula —(R*)$_n$—S(=O)$_2$—R; and, Q$^{3*}$ is a moiety of the formula —O—[Si($R^1$)$_2$—O]$_y$—Si($R^1$)$_2$—(R*)$_n$—S(=O)$_2$—R, and wherein each of $R^1$, R* and R is as defined above, and each subscript n and y are as defined above.

DETAILED DESCRIPTION OF THE INVENTION

Figure 1:
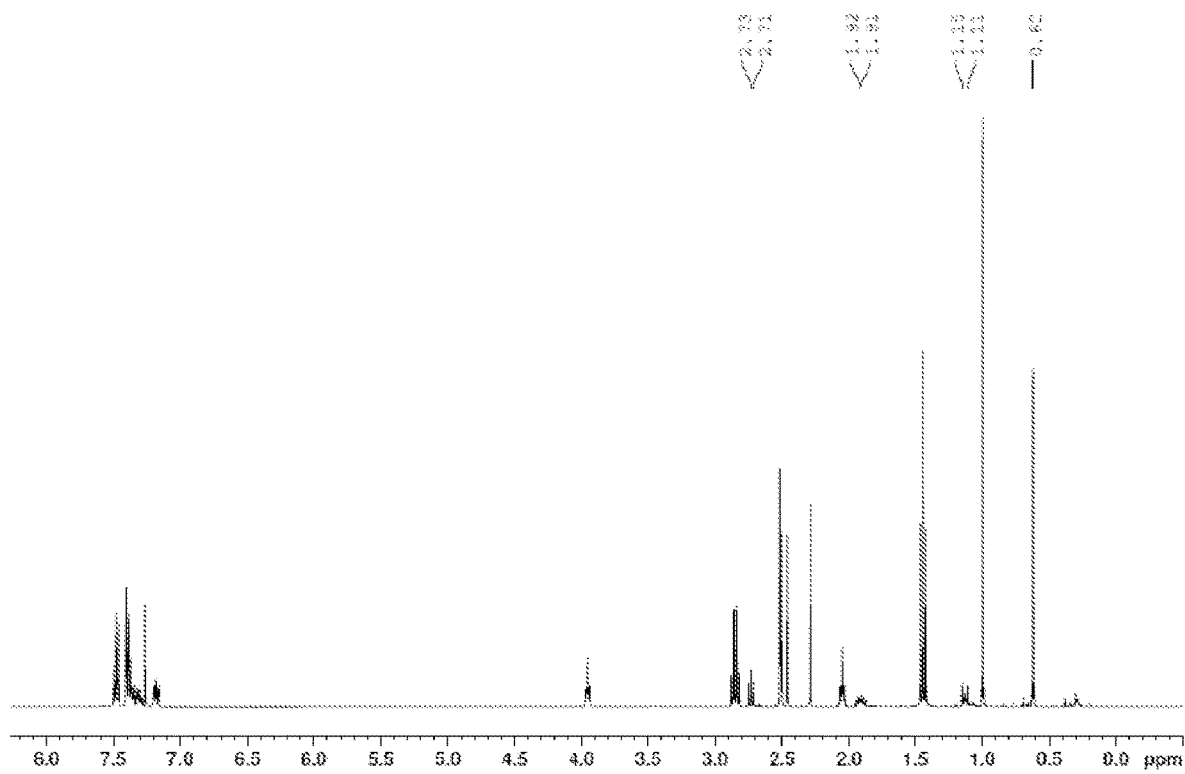
FIG. 1 is an 1H-NMR spectrum of the reaction mixture of step b in CDCl3 of Example 1.

In the specification and claims herein, the following terms and expressions are to be understood as indicated.

The singular forms "a," "an," and "the" include the plural, and reference to a particular numerical value includes at least that particular value, unless the context clearly dictates otherwise.

The use of any and all examples, or exemplary language (e.g., "such as") provided herein, is intended merely to better illustrate the invention and does not pose a limitation on the scope of the invention unless otherwise claimed.

The terms, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

No language in the specification should be construed as indicating any non-claimed element as essential to the practice of the invention.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

Other than in the working examples or where otherwise indicated, all numbers expressing amounts of materials, reaction conditions, time durations, quantified properties of materials, and so forth, stated in the specification and claims are to be understood as being modified in all instances by the term "about" whether or not the term "about" is used in the expression.

In one embodiment herein, it will be understood that any numerical range recited herein includes all sub-ranges within that range and any combination of the various endpoints of such ranges or sub-ranges, be it described in the examples or anywhere else in the specification.

It will also be understood herein that any of the components of the invention herein as they are described by any specific genus or species, or detailed in the examples section of the specification, can be used in one embodiment to define an alternative respective definition of any endpoint of a range elsewhere described in the specification with regard to that component, and can thus, in one non-limiting embodiment, be used to supplant such a range endpoint, elsewhere described.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

The expression "organic group" as described used is understood to be any aliphatic group such as linear or branched alkyl, linear or branched alkenyl, aryl, aralkyl, cycloalkyl, and the like containing up to 60 carbon atoms, which can optionally contain at least one heteroatom and/or different heteroatom groups in the respective organic group described herein.

The term "alkyl" means any monovalent, saturated straight, branched or cyclic hydrocarbon group. Non-limiting examples of alkyls include methyl, ethyl, isopropyl, propyl, butyl and isobutyl.

The expression of sulfenylated silicon-containing reaction product shall be understood to comprise both sulfenylated silane compounds as well as sulfenylated silicone compounds.

The invention herein describes the method of making a Si—C bond having heterofunctional groups such sulfenyls and sulfones. The final products (telechelic silanes and siloxanes with sulfone groups) are intermediates for the formation of additives which can have application as additives in the area of Li-Ion batteries.

In one specific non-limiting embodiment herein, halobromo alkane is reacted with metallic alkyl sulfide to form 1-chloro-3-methylsulfanyl-propane, followed by reaction with Mg, followed by reaction with dimethyldichlorosilane to form chloro-dimethyl-(3-methylsulfanylpropyl)silane). In one or more embodiments, Mg can be replaced by one of Li, Na, Al, Cs, Sn, Ni, and Hg.

The reaction of chloro-dimethyl-(3-methylsulfanylpropyl)silane) with water leads the formation of telechelic siloxane having methylsulfanylpropane functionality, which upon oxidation leads to the formation of telechelic methylsulfonylpropane siloxanes.

In one embodiment herein, the process of the invention can be illustrated by the following reaction scheme of steps (a), (b), optional step (b-1), and (c), wherein the generic formulae have preferred species thereof located immediately below:

Formulae (I), (II), (III), (IVa), (IV), (V) and (VI) as described herein can be understood with reference, in a non-limiting manner, to the reaction steps (a), (b), (b-1), and (c) noted above. It will be understood that in the process described herein, the contacting step (b) must precede oxidizing step (c). In above formulae, X is a halogen selected from the group consisting of Cl, Br and I; each subscript n is an integer from 1 to about 10; each R is H or a monovalent organic group having from 1 to about 12 carbon atoms; each R* is a divalent organic group having from 1 to about 8 carbon atoms, and each $R^1$ is a monovalent organic group having from 1 to about 12 carbon atoms; the subscript a is 0 or 1; and, the subscript b is an integer of from 1 to about

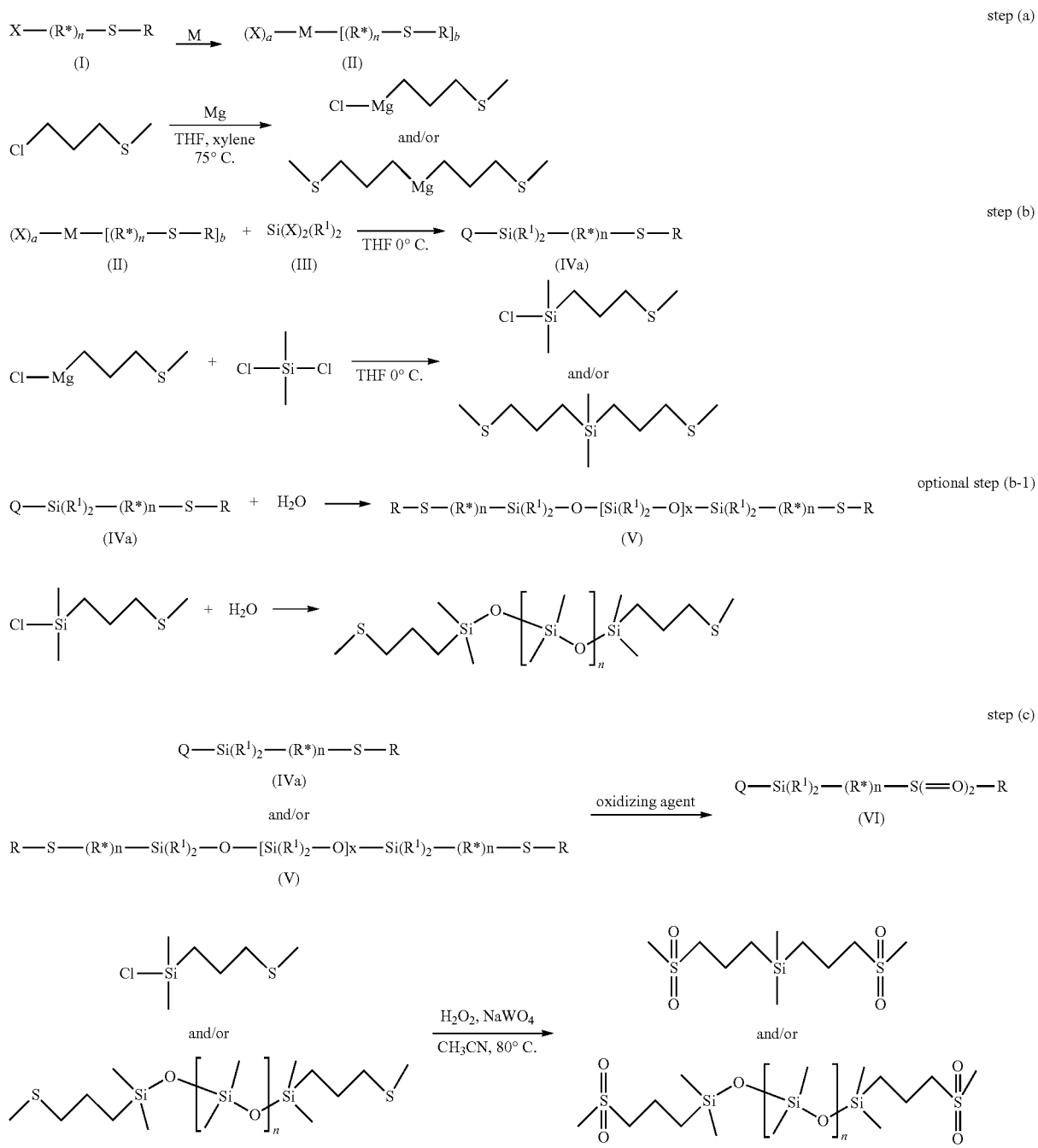

10, with the proviso that when a is 0, then b is from 1 to about 10, and when a is 1, then b is 1.

In one specific embodiment compound (I) of the process step (a) described herein can be produced by any suitable commercial process. However, in one preferable embodiment compound (I) can be formed from the reaction of a brominated halogen organo compound, of the general formula (Ia):

$$X—R^*—Br \qquad (Ia)$$

with an alkali metal-thioalkoxide of the formula (Ib):

$$Y—S—R \qquad (Ib)$$

wherein X is a halogen selected from the group consisting of Cl, Br and I, preferably Cl, and R* is as defined above, and most preferably, formula (Ia) is 1-bromo-3-chloropropane, and wherein Y is an alkali metal, such as the non-limiting examples of Li, Na and K, preferably Na, and R is as defined above, and most preferably formula (Ib) is sodium thiomethoxide. Preferably the reaction is conducted in a molar ratio range of from about 0.5:2.0 to about 2.0:0.5 of compound (Ia) to compound (Ib), more preferably in about an equimolar ratio. Preferably, the reaction is conducted at a temperature of from about 20° C. to about 30° C., preferably at about room temperature. Each of the process steps described herein can be conducted neat or in the presence of an organic solvent, such as the non-limiting examples of alkane solvents such as hexane, heptane, dodecane and so on, cyclic alkanes such as cyclopentane, cyclohexane and cyclooctane, Furan solvents such as tetrahydrofuran, Aromatic solvents such as toluene, Acetal solvents such as dioxane, ester solvents such as ethyl acetate, nitrile solvents such as acetonitrile, glycolic solvents such as ethylene glycol dimethyl ether, Ether solvents such as diethyl ether, di-isopropyl ether, dipenyl ether, polyethyleneglycolalkylethers, sulfides such as dimethyl sulfide, diethyl sulfide, dipropyl sulfide, dibutyl sulfide, sulfoxide solvents such as dimethyl sulfoxide, cyclic amide solvents such as N-methylpyrrolidone, formamide solvents such as N,N-dimethyl formamide, imidazole solvents such as methyl & dimethyl imidazole, ketones such as acetone, methyl ethyl ketone, and most preferably toluene. In addition, the reaction of (Ia) and (Ib) can optionally be conducted in the presence of a phase transfer catalyst such as those known to those skilled in the art, and in one non-limiting example is tetrabutylammonium bromide. The reaction can be conducted over any suitable period, but preferably, can be conducted over a period of from 1 hour to 12 hours, preferably 2 to 8 hours.

The compound of the formula (Ia) above can also be present as a reaction initiator in the reacting step (a) described herein above in the reaction scheme steps noted above, preferably as an unreacted reactant of the above described reaction of formulae (Ia) and (Ib). Preferably, the compound of the formula (Ia) can be present in an amount of up to about 2 weight percent, based on the weight of the reactants in step (a) of the process described herein, more preferably reaction step (a) can comprises up to about 2 wt. % of chlorobromo propane. In certain situations, the addition of the compound of formula (Ia) can result in an exotherm in the reaction step (a), which can be controlled by recurrent stepwise addition as described herein and conventional cooling techniques such as dry ice. In some embodiments, the recurrent addition is performed by dispensing the intermediate dropwise. In one embodiment herein, any one or more of the process steps described herein and specifically, (a), (b), (b-1) and (c) can optionally be conducted in the presence of at least one initiator selected from the group consisting of dihaloalkanes, metal iodides and iodine, as well as compounds of formula (Ia), most preferably, chlorobromo propane, which can be added at once or in a drop-wise fashion to the reaction mixture.

The reaction step (a) can entail reacting compound (I) with the metal (M), which metal can comprise one or more of the metals described herein. Such metals can be present in elemental form and/or in an organic compound. In one embodiment, the metal M can be a Grignard reagent. In one embodiment, the metal is magnesium. In some embodiments, the compound (I) is a 1-bromo-3-halogenalkane. In one embodiment, the compound (I) is 1-bromo-3-chloropropane. The reaction of compound (I) and metal M can be conducted in an organic solvent, such as those described herein, THF and/or xylene at a temperature of from about 60° C. to about 80° C. In one or more embodiments, the temperature is about 65° C. to about 80° C., and even in some other embodiments, the temperature is at about 75° C. In some embodiments, the molar ratio of compound (I) to metal M is from about 0.5:2.0 to 2.0:0.5. In some other embodiments, the molar ratio of compound (I) to metal M is in about an equimolar ratio. The reaction can be conducted over any suitable period. In some embodiments, the reaction can be conducted over a period of from about 10 minutes to about 2 hours, in some embodiments, reaction can be conducted over a period of from about 30 minutes to 1.5 hours. As described above, reaction step (a) can be conducted in the presence of up to about 2 wt. % of chlorobromo propane as an initiator. In an embodiment, the addition of compound (I) to metal M is conducted dropwise over an extended period of time, such as that time period described herein above.

The reaction step (a) produces the sulfenyl metal intermediate (II) described herein above. In one embodiment of formula (II) when the subscript a is 0, then the subscript b is 1 to provide a di- or greater functionality sulfenyl metal intermediate. In an alternative embodiment, when a is 1, then subscript b is 1 and the compound of formula (II) is a halogenated sulfenyl metal intermediate.

The sulfenyl metal intermediate (II) of step (a) is subsequently contacted in step (b) with silane of the formula (III) as described above in order to form a Si—C bond, i.e., to obtain the sulfenylated silicon-containing reaction product of the general formula (IVa):

$$\text{Q-Si}(R^1)_2—(R^*)_n—S—R \qquad (IVa)$$

where Q is $Q^1$ or $Q^2$, and wherein $Q^1$ is a halogen selected from the group consisting of Cl, Br and I; and $Q^2$ is a moiety of the formula —$(R^*)_n$—S—R; and wherein each of $R^1$, R* and R are defined as described above, and more preferably, R and $R^1$ are each methyl, and each R* is —(CH$_2$)—, and each subscript n is an integer from 1 to 10, in some embodiments, from 2 to 8, in some other embodiments from 2 to 4. In an embodiment, the silane of the general formula (III) above, which is used in step (b) is dimethyldichlorosilane. In an embodiment, $Q^1$ is Cl.

In a non-limiting embodiment of step (b), the sulfenyl metal intermediate (II), in one embodiment, the halogenated sulfenyl metal intermediate (II), is contacted with the silane of formula (III) by the recurrent addition of the sulfenyl metal intermediate (II) to the silane (III), For example, the recurrent addition is performed by dispensing the sulfenyl metal intermediate (II) dropwise to the silane (III).

In some embodiments, the reaction can take place in the presence of the organic solvent(s) described herein above, e.g., THF and/or xylene.

In a non-limiting embodiment of step (b), the sulfenyl metal intermediate (II) is contacted with the silane of formula (III) wherein the silane of formula (III) is present in molar stoichiometric excess with respect to the sulfenyl metal intermediate of formula (II).

In one embodiment of step (b), the molar ratio of compound (III) to compound (II) is generally in a molar excess, such as from about 2:1 to about 7:1 molar excess, however an equimolar ratio is also contemplated. The use of a molar excess and/or the use of the above-described sulfenyl metal intermediate (II) can lead to the formation of the silane dimer form of formula (IVa), i.e., when Q is a moiety of the formula —(R*)$_n$—S—R. The reaction step (b) can be conducted at from −5° C. to about 10° C., in one embodiment at about 0° C., and for any suitable period but in one embodiment from about 30 minutes to about 3 hours, in one embodiment from about 1 to 2 hours.

However, while not required for the process described herein, in an embodiment, the sulfenylated silicon-containing reaction product (IVa), in an embodiment, wherein Q is $Q^1$, is optionally contacted with water in reaction step (b-1). The amount of water to reaction product (IVa) is generally in a molar ratio range of 0.5:1 up to about 2.0 molar amount, and in one embodiment, about an equimolar amount of reaction product (IVa) to water. The reaction step (b-1) forms a sulfenylated siloxane of the general formula (V):

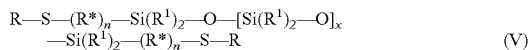

wherein each R, R* and $R^1$ are as defined herein, and each n is as defined herein, and the subscript x is an integer from 0 to 10, in some embodiments from 1 to 8, in some embodiments from 1 to 4. The reaction step (b-1) can be conducted at about room temperature and for a suitable period, such as from about 10 minutes to about 2 hours, in one embodiment from about 30 minutes to about an hour. The use of water in reaction step (b-1) results in the formation of the siloxane of formula (V) (a dimer), which siloxane (V) is then acted upon together with compound (IVa), or exclusively (depending on the amount of hydrolysis which occurs in step (b-1)) during the reaction step (c).

Following step (b), and if present, step (b-1), the compounds (IVa), and if present, compound (V), can optionally be treated with a base prior to step (c). Suitable bases can include any commercially available bases such as ammonia, amines, metal hydroxides, e.g., NaOH, and the like. The amount of base employed can be determined by those skilled in the art but should generally provide for a pH of about from about 5 to 8, in some embodiments about 7, to the reaction product of step (b) and/or (b-1).

The sulfenylated silicon-containing reaction product (IVa), and if present, sulfenylated siloxane reaction product (V), is then contacted with an oxidizing agent in step (c) to form a sulfonylated silicon compound of the general formula (VI):

where Q* is $Q^{2*}$ or $Q^{3*}$, wherein $Q^{2*}$ is a moiety of the formula —(R*)$_n$—S(=O)$_2$—R; and $Q^{3*}$ a moiety of the formula —O—[Si($R^1$)$_2$—O]$_y$—Si($R^1$)$_2$—(R*)$_n$—S(=O)$_2$—R, and wherein each of $R^1$, R* and R is as defined herein above, and each subscript n and y are as defined herein.

Suitable oxidizing agents include oxygen, ozone, hydrogen peroxide and organic peroxides. The oxidation may be carried out using ozone/nascent oxygen [O], and hydrolysis can be avoided. In the presence of ozone, only the oxidized product forms with no byproducts. In the presence of hydrogen peroxide, the Si—Cl bond is completely hydrolyzed.

The reaction step (c) can be conducted in the presence of any suitable oxidation catalyst, such as the non-limiting example of sodium tungstate dihydrate. The reaction step (c) can also be conducted in the presence of any of the organic solvents described herein, in some embodiments, acetonitrile. The reaction step (c) can be conducted at a temperature of from about 65° C. to about 80° C., preferably from about 70° C. to about 75° C., and for a period of from about 1 hour to about 8 hours, preferably from about 2 hours to 4 hours. The amount of compound (IV) and/or (V) to oxidizing agent can generally range from about 0.5:2 to about 2.0:0.5, preferably in equimolar amounts.

The purity of the sulfonylated silicon-containing compound of the formula (VI) can be greater than about 90 wt. %, in some embodiments greater than 95 wt. %, and most in some embodiments greater than about 99 wt. %, each of said ranges being based on the total weight of the reaction product mixture of step (c), in some embodiments after purification of the reaction product (VI), which can be done with conventional purification techniques such as decanting, extraction, distillation, and the like.

The sulfonylated silicon compound of the general formula (VI) can then be further reacted as is known in the art to produce various commercially suitable materials, such as the non-limiting use of the sulfonylated silicon compound of the general formula (VI) in an electrolytic composition, such as an electrolytic composition employed in Li-ion batteries. Any of the other herein described formulae compounds can also be used in an electrolyte composition.

EXAMPLES

Example 1

Synthesis of Sulfide Precursor (2)

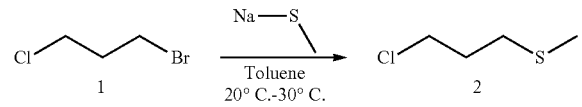

1-Bromo-3-chloropropane (1) (500 g, 3.18 mol) was added to 235 gm toluene in a 3 L 3-necked round-bottomed flask equipped with an overhead stirrer and an addition funnel. Tetrabutylammonium bromide (25 g, 0.08 mol) was added as a phase transfer catalyst. The mixture was cooled down to 24° C. on an oil bath. 21% aqueous solution of Sodium thiomethoxide (1058 g, 3.17 mol) was added dropwise to the reaction mixture over a period of 3 hours at 10-30° C. with constant stirring. The reaction temperature was maintained at the same temperature for another 2 hours. The organic and aqueous fractions were separated using a separating funnel. Again (7 g, 0.02 mol) Tetrabutylammonium bromide and a 21% aqueous solution of Sodium thiomethoxide (160 g, 0.48 mol) were added dropwise to the reaction mixture over a period of 2 hours at 10° C.-30° C. with constant stirring. The reaction temperature was maintained at the same temperature for another 2 hours. The organic fraction was washed with water (200 ml) and the combined aqueous fractions were washed with toluene (50 ml). Toluene was removed from the organic fraction under reduced pressure and the crude was purified by fractional distillation to remove unreacted starting material. Pure 1-chloro-3-methylsulfanyl-propane 95% (2) with byproducts of Di (methyl sulfanyl) propane 3% and 2% Chloro bromopropane were obtained as a colourless liquid at ~0 mbar, 56° C. It was found that typically up to 2% Chlorobromo propane is required in the mixture, as it act as initiator during the reaction.

Formation of Sulfenyl Metal Intermediate (Step (a)) and Subsequent Reaction with Dimethyldichlorosilane (Step (b)) Followed by Contact with Water (Step (b-1))

down to ~0° C. and the solution was added dropwise under continuous stirring. Magnesium chloride was seen to precipitate slowly with the progress of addition. After completion of addition, the reaction mixture was maintained at the same temperature for another 2 h. The reaction mixture was then allowed to warm up to room temperature and stirred for 2 h under nitrogen atmosphere. Subsequently THF and unreacted dimethyldichlorsilane were removed from the reaction mixture under reduced pressure (~11 mbar, 55° C.). $^1$H NMR analysis suggests formation of the Si—C bond as indicated by the multiplets at ~1.1 ppm and ~1.9 ppm (FIG. 1).

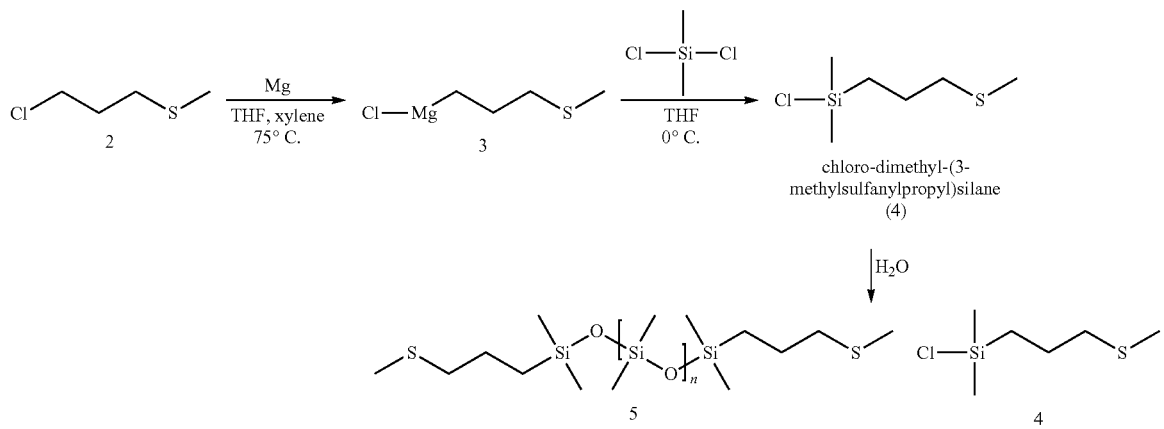

Reaction procedure: Magnesium (23 g, 0.95 mol) was weighed and added to a dry 2 L, 4-necked round-bottomed flask fitted with a condenser, an addition funnel and a magnetic stirring bar. The reaction setup was flushed with nitrogen. 160 ml anhydrous tetrahydrofuran and 400 ml of xylene were added to the reaction vessel under nitrogen atmosphere. 100 g (0.80 mol) of 1-chloro-3-methylsulfanyl-propane (2) was taken in the addition funnel. The reaction mixture was heated to 65° C. and ~15% of 1-chloro-3-methylsulfanyl-propane (2) was added to the magnesium with constant stirring. No exotherm was observed at this point. Subsequently the reaction temperature was raised to 75° C. and 1-Bromo-3-chloropropane (3.2 g, 0.02 mol) was added to the reaction mixture in one shot. An exotherm of 20° C. was observed at this point. The exotherm was controlled by cooling using dry ice and the temperature lowered to ~70° C. At this temperature the remaining 1-chloro-3-methylsulfanyl-propane (2) was added dropwise with constant stirring. The reaction temperature was maintained around 75° C. by controlling the addition rate and cooling simultaneously. With progress of reaction, the reaction mixture turned greyish in color, confirming formation of the sulfenyl metal intermediate. After completion of the addition, the reaction mixture was stirred at 75° C. for another 1 h. Subsequently the heating was switched off and the solution was allowed to cool down to room temperature under nitrogen atmosphere. Simultaneously, another dry 2 L 4-necked round-bottomed flask was set up equipped with overhead stirrer and an addition funnel, and flushed with nitrogen. Using a cannula the solution was transferred into the addition funnel. Dimethyldichlorosilane (310 g, 2.4 mol) and 400 ml xylene was added to the second round bottomed flask under nitrogen atmosphere. The solution was cooled Step (c): Oxidation of chloro-dimethyl-(3-methylsulfanylpropyl)silane (4) and Higher Analogues (5)

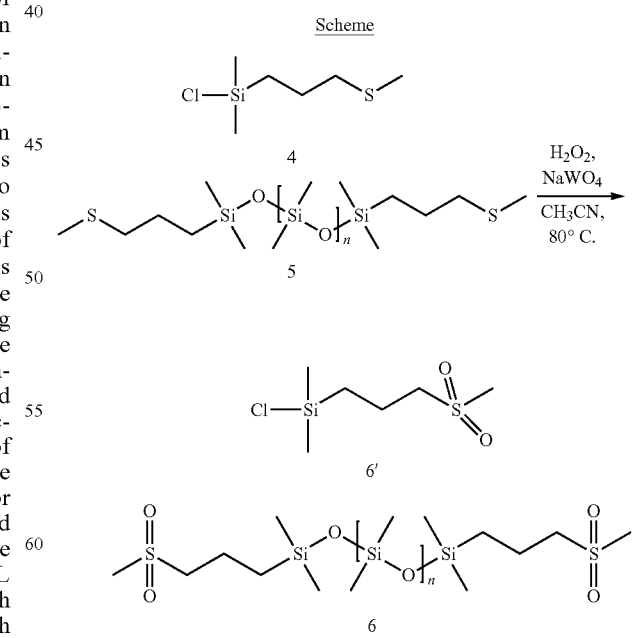

Reaction procedure: The organic fraction from the previous step was transferred into a 2 L 3-necked round-bottomed flask equipped with condenser, an addition funnel and magnetic stirring bar. 250 ml of acetonitrile was added to the reaction mixture. Sodium tungstate dihydrate (5 g, 15 mmol) was dissolved in 40 ml of water and added to the reaction mixture. 30% solution of hydrogen peroxide in water (220 g, 1.94 mol) was taken in the addition funnel. The reaction mixture was heated to 70° C. and hydrogen peroxide was added dropwise over a period of 2 h with continuous stirring. Exotherm was observed during addition of the hydrogen peroxide. The reaction temperature was maintained around 75° C. by cooling and slow addition. After completion of addition the reaction mixture was stirred at the same temperature for another 3 h. Subsequently acetonitrile was removed from the reaction mixture under reduced pressure and the organic fraction was separated from the aqueous layer using separating funnel. The aqueous fraction was extracted with ethyl acetate (2×100 ml) and the material recovered by stripping the solvent was added to the organic fraction. $^1$H NMR analyses showed complete oxidation of the starting material into sulfone derivatives of siloxane dimers and higher analogues (6). The organic fraction was taken as such for the next step.

Comparative Example 1: Oxidation of Sulfide Followed by Treatment with Dimethyldichlorosilane and Magnesium Step 1: Oxidation of 1-chloro-3-methylsulfanyl-propane (2)

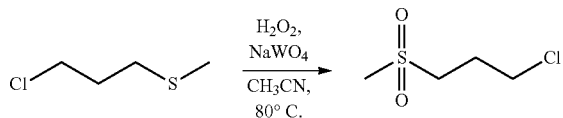

Procedure: 1-chloro-3-methylsulfanyl-propane (10 g, 80 mmol) was taken in a 250 ml 3-necked round-bottomed flask equipped with a condenser, addition funnel and magnetic stirrer bar. Xylene (50 ml) and acetonitrile (50 ml) were added to the flask. Sodium tungstate (0.5 g, 1.5 mmol) was dissolved in 2 ml water and added to the reaction mixture. The reaction mixture was heated to 75° C. and 30% hydrogen peroxide in water (20.7 g, 200 mmol) was added dropwise under continuous stirring. The reaction mixture was stirred at the same temperature for 3 h. Subsequently acetonitrile was removed under reduced pressure. The xylene fraction was separated from the aqueous fraction and solvent was removed using a rotary evaporator. $^1$H NMR analyses showed complete oxidation of the starting material into 1-chloro-3-methylsulfonyl-propane.

Step 2: Reaction of Magnesium with 1-chloro-3-methylsulfonyl-propane

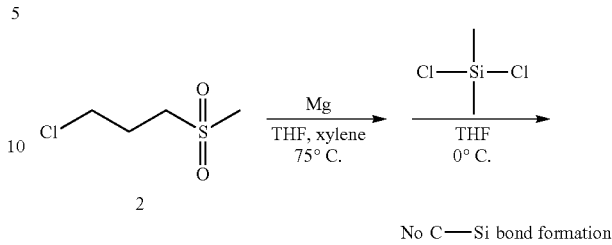

No C—Si bond formation

Figure 2:
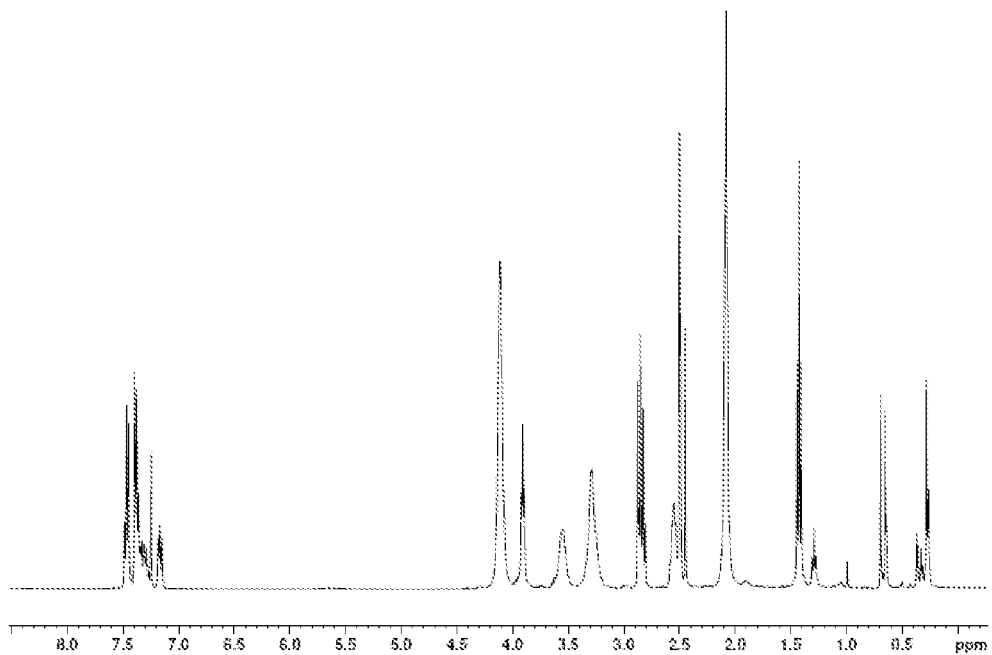
FIG. 2 is an 1H NMR of reaction mixture after step 2 of comparative example (Step of treatment with silane and Mg after oxidation)
Figure 3:
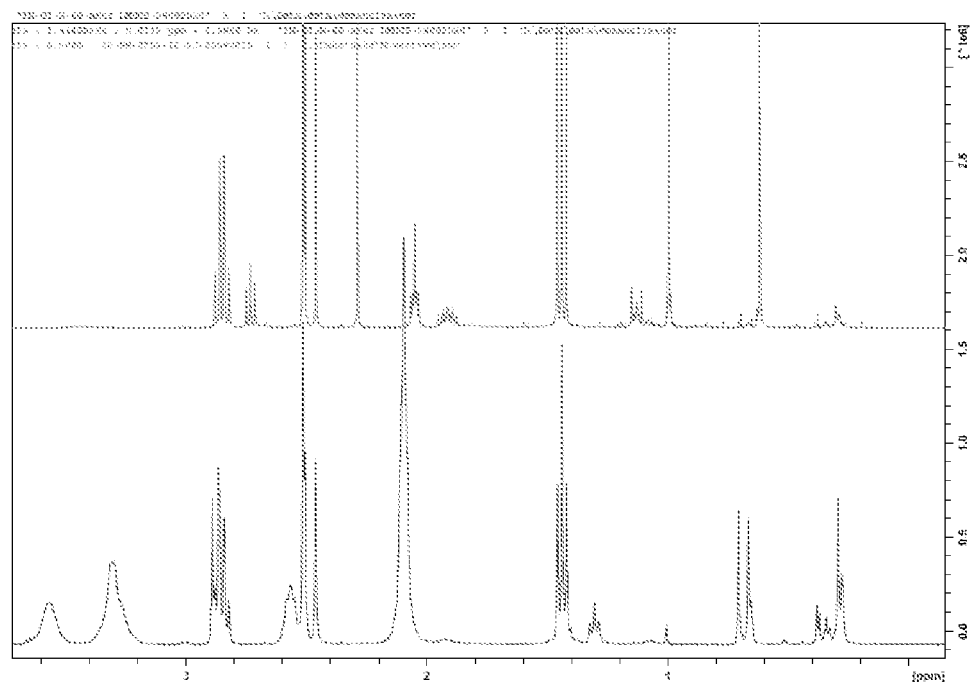
FIG. 3 is a spectrum comparison of reaction mixtures after reaction in example 1 (top spectrum) and comparative example 1 (bottom spectrum). In case of comparative example 1, oxidation of sulfide to sulfone is conducted before treatment with silane and Mg. In the comparative example, C—Si bond is not formed as indicated by absence of the multiplets at ~1.1 ppm & 1.9 ppm.

Procedure: Magnesium (340 mg, 14 mmol) was taken in a 100 ml 3 necked round bottomed flask fitted with a condenser. The reaction setup was flushed with nitrogen and anhydrous THF (40 ml) and xylene (40 ml) was added to the reaction vessel under nitrogen atmosphere. 1-chloro-3-methylsulfonyl-propane (2 g, 12.8 mmol) was added dropwise to the reaction mixture at 75° C. No exotherm was observed. The reaction was left to stir overnight at the same temperature and under nitrogen atmosphere. Magnesium turnings were seen to disappear suggesting metal insertion. In another 250 ml round-bottomed flask flushed with nitrogen, dimethyldichlorosilane (2.4 g, 19.2 mmol) and Xylene (40 ml) were taken. The reaction mixture was cooled down to 0° C. At the same temperature, the reaction mixture from the first reaction vessel was added dropwise using a syringe. The mixture in the second vessel was stirred at 0° C. for 1 h, and then allowed to warm up to room temperature. 1H NMR analysis suggested no formation of a Si—C bond as indicated by absence of any distinct multiplet at ~1.1 ppm and 1.9 ppm (FIG. 2).

While the invention has been described with reference to certain embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention but that the invention will include all embodiments falling within the scope of the appended claims.

The invention claimed is:

1. A process for the synthesis of sulfonyl silanes, comprising the steps of:
   (a) reacting a compound of formula (I):

X—(R*)$_n$—S—R    (I)

with a metal (M) selected from the group consisting of Li, Na, Mg, Al, Cs, Sn, Ni, and Hg,
   to obtain a sulfenyl metal intermediate of the formula (II):

(X)$_a$-M-[(R*)$_n$—S—R]$_b$    (II)

(b) contacting the sulfenyl metal intermediate (II) with a silane of formula (III):

Si(X)$_2$(R$^1$)$_2$    (III)

to obtain a sulfenylated silicon-containing reaction product, wherein the sulfenylated silicon-containing reaction product is a sulfenylated silane, and treating the sulfenylated silane with water to form a sulfenylated siloxane;

(c) contacting the sulfenylated siloxane with an oxidizing agent, and wherein X is a halogen selected from the group consisting of Cl, Br and I; each subscript n is an integer from 1 to 10; each R is H or a monovalent organic group having from 1 to 12 carbon atoms; each R* is a divalent organic group having from 1 to 8 carbon atoms; and, each $R^1$ is a monovalent organic group having from 1 to 12 carbon atoms; the subscript a is 0 or 1; and, the subscript b is an integer of from 1 to 10, with the proviso that when a is 0, then b is from 1 to 10, and when a is 1, then b is 1.

2. The process of claim 1, wherein the sulfenylated silicon-containing reaction product of step (b) is of the formula (IVa):

$$\text{Q-Si}(R^1)_2\text{---}(R^*)_n\text{---S---R} \qquad (\text{IVa})$$

where Q is $Q^1$ or $Q^2$, wherein $Q^1$ is a halogen selected from the group consisting of Cl, Br and I;

and $Q^2$ is a moiety of the formula —$(R^*)_n$—S—R.

3. The process of claim 2, wherein Q is a halogen selected from the group consisting of Cl, Br and I.

4. The process of claim 2, wherein Q is a moiety of the formula —$(R^*)_n$—S—R.

5. The process of claim 2, wherein R and $R^1$ are each methyl, each

R* is —(CH$_2$)—, and each n is an integer from 2 to 4.

6. The process of claim 1, wherein in step (b)

the sulfenyl metal intermediate of formula (II) is contacted with the silane of formula (III) wherein the silane of formula (III) is present in molar stoichiometric excess with respect to the sulfenyl metal intermediate of formula (II).

7. The process of claim 1, wherein in step (b) the sulfenyl metal intermediate (II) is contacted with the silane of formula (III) by recurrent addition of the sulfenyl metal intermediate of formula (II) to the silane of formula (III).

8. The process of claim 7, wherein the recurrent addition is performed by dispensing the sulfenyl metal intermediate of formula (II) dropwise to the silane of formula (III).

9. The process of claim 1, wherein the sulfenylated siloxane is represented by the general formula (V):

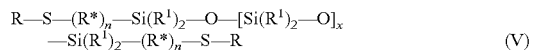

$$R\text{---S---}(R^*)_n\text{---Si}(R^1)_2\text{---O---}[\text{Si}(R^1)_2\text{---O}]_x\text{---Si}(R^1)_2\text{---}(R^*)_n\text{---S---R} \qquad (V)$$

wherein each R and $R^1$ are each independently a monovalent aliphatic group of from 1 to 12 carbon atoms, each R* is a divalent organic group of from 1 to 8 carbon atoms, each subscript n is an integer from 1 to 10 and the subscript x is an integer from 0 to 10.

10. The process of claim 1, wherein the sulfenylated silicon-containing reaction product of step (b) is treated with a base and the water prior to step (c) to form the sulfenylated siloxane.

11. The process claim 1, wherein the oxidizing agent of step (c) is selected from the group consisting of oxygen, ozone, hydrogen peroxide, and an organic peroxide.

12. The process of claim 1, wherein one or more of the process steps (a), (b) or (c) is carried out in the presence of an initiator.

13. The process of claim 12, wherein the initiator is selected from the group consisting of dihaloalkanes, metal iodides and iodine.

* * * * *